US009198532B2

(12) United States Patent
 Barrows et al.

(10) Patent No.: US 9,198,532 B2
(45) Date of Patent: Dec. 1, 2015

(54) ENERGY EFFICIENT APPARATUS AND METHOD FOR POPPING POPCORN

(75) Inventors: Ryan H. Barrows, Eau Claire, WI (US); Michael R. Berge, Eau Claire, WI (US)

(73) Assignee: National Presto Industries, Inc., Eau Claire, WI (US)

(*) Notice: Subject to any disclaimer, the term of this patent is extended or adjusted under 35 U.S.C. 154(b) by 545 days.

(21) Appl. No.: 12/776,101

(22) Filed: May 7, 2010

(65) Prior Publication Data
US 2011/0274804 A1  Nov. 10, 2011

(51) Int. Cl.
| A23L 1/18 | (2006.01) |
| B01F 7/00 | (2006.01) |
| A47J 27/00 | (2006.01) |
| A47J 36/16 | (2006.01) |
| A47J 37/06 | (2006.01) |

(52) U.S. Cl.
CPC .............. *A47J 27/004* (2013.01); *A23L 1/18* (2013.01); *A47J 36/165* (2013.01); *A47J 37/0629* (2013.01)

(58) Field of Classification Search
CPC ........ A23L 1/18; A47J 27/004; A47J 36/165; A47J 37/0629
USPC .......... 99/323.5, 348, 323.8, 323.4, 357, 401, 99/409, 410, 501, 503, 574, 577; 219/432, 219/442, 433, 436, 438; 366/326, 331, 366/244–248, 252–254, 281, 283, 284, 343, 366/347; 426/449
See application file for complete search history.

(56) References Cited

U.S. PATENT DOCUMENTS

| 110,916 | A | * | 1/1871 | Houcke | 366/143 |
| 798,570 | A | * | 8/1905 | Dalby | 366/248 |
| 1,444,244 | A | * | 2/1923 | Grossenbacher | 366/330.1 |
| 1,974,611 | A | * | 9/1934 | Gundelfinger | 366/326.1 |
| 3,209,672 | A | * | 10/1965 | Baunach | 99/323.7 |
| 3,722,399 | A | | 3/1973 | Cole | |
| 3,913,896 | A | * | 10/1975 | Hawke | 366/347 |
| 4,138,937 | A | * | 2/1979 | De Weese | 99/323.5 |
| 4,149,455 | A | | 4/1979 | Ross | |
| 4,152,974 | A | | 5/1979 | Tienor | |
| D256,019 | S | | 7/1980 | Boldt et al. | |
| D279,070 | S | | 6/1985 | Morrison et al. | |
| D280,062 | S | | 8/1985 | Cesaroni | |
| D280,174 | S | | 8/1985 | Cesaroni | |

(Continued)

FOREIGN PATENT DOCUMENTS

DE  3225450 A1 *  1/1984  .............. B01F 7/32

OTHER PUBLICATIONS

Presto® Hot Air Popper Instructions, 2004, 4 pages.

(Continued)

*Primary Examiner* — Dana Ross
*Assistant Examiner* — Ket D Dang
(74) *Attorney, Agent, or Firm* — Patterson Thuente Pedersen, P.A.

(57) ABSTRACT

A popcorn popper having a heat source transferring heat to a heating surface and also having a reflective surface for focusing the heat radiated by the heat source toward the heating surface. The popcorn popper can include a mechanical stirrer on the heating surface for shifting the kernels during heating and evenly distributing the kernels across the heating surface. The popcorn popper can have a cover with an integrated reservoir for holding toppings for the popcorn, wherein the reservoir is adapted to drain the topping through the cover without fouling the cover air vents and evenly distribute the topping onto the kernels.

15 Claims, 12 Drawing Sheets

(56) References Cited

U.S. PATENT DOCUMENTS

| | | | |
|---|---|---|---|
| D281,137 S | 10/1985 | Cesaroni | |
| 4,563,561 A * | 1/1986 | Vaeth et al. | 219/735 |
| 4,658,708 A * | 4/1987 | Rastoin | 99/323.9 |
| 4,763,568 A | 8/1988 | Kiczek | |
| 5,037,210 A * | 8/1991 | Bliss | 366/279 |
| 5,163,357 A * | 11/1992 | Felknor et al. | 99/323.5 |
| 5,397,879 A | 3/1995 | Geissler | |
| D360,102 S | 7/1995 | Geissler et al. | |
| 5,615,951 A * | 4/1997 | Gabriele | 366/311 |
| 5,695,673 A | 12/1997 | Geissler | |
| D521,796 S | 5/2006 | Bertulis | |
| D615,797 S | 5/2010 | Berge et al. | |
| 7,925,189 B2 * | 4/2011 | Norigoe | 399/256 |
| 2002/0062743 A1 * | 5/2002 | Weiss | 99/348 |
| 2006/0219100 A1 * | 10/2006 | Gelfand | 99/348 |

OTHER PUBLICATIONS

Presto® PowerPop® Microwave Multi-Popper Instructions, 2008, 8 pages.

West Bend® Stir Crazy® Corn Popper Instruction Manual, 2007, 8 pages.

West Bend® Kettle Krazy® Corn Popper Instruction Manual, 2009, 10 pages.

\* cited by examiner

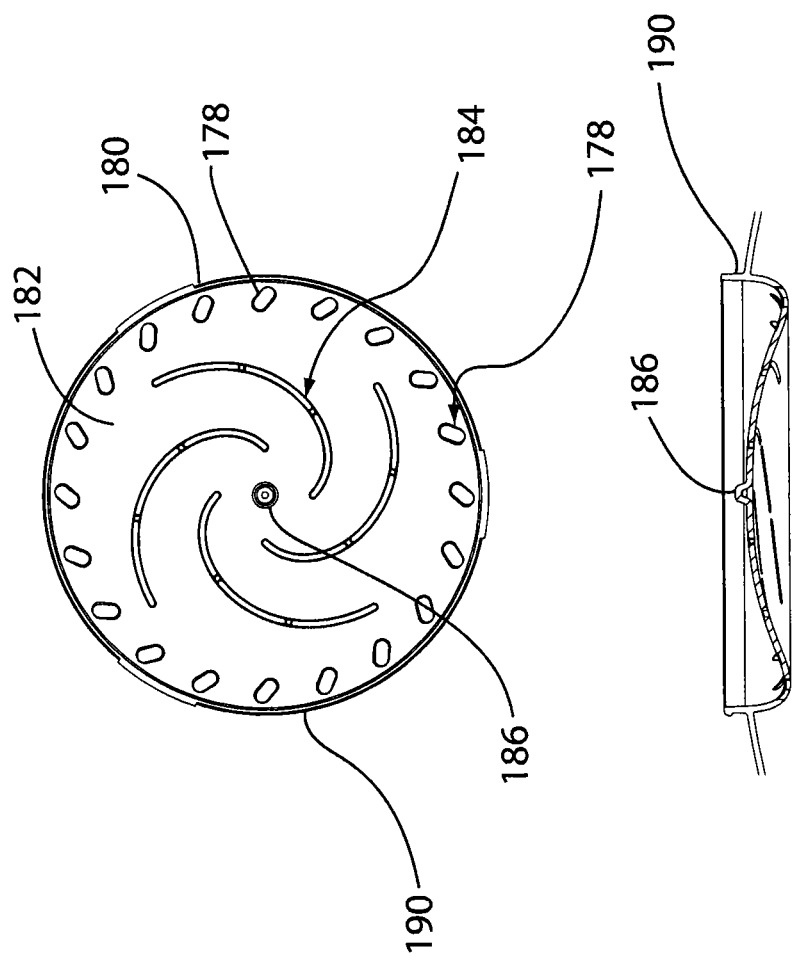

ENERGY EFFICIENT APPARATUS AND METHOD FOR POPPING POPCORN

FIELD OF THE DISCLOSURE

The present invention is directed to an apparatus and related methods for popping popcorn. More specifically, the present invention is directed to a popcorn popper including features to improve popping efficiency and preparation.

BACKGROUND OF THE DISCLOSURE

Popcorn is a commonly consumed snack food produced by heating kernels of corn until the moisture within the kernel vaporizes into steam causing the starch within the kernel to temporarily gelatinize and the shell of the kernel to erupt. The internal moisture of the kernel is quickly heated to a temperature of approximately 356° F. (180° C.) to vaporize the moisture and pop the kernel. If the kernel is not sufficiently heated or is heated too slowly, the kernel will not pop. Similarly, if one side of the kernel is heated too quickly, the kernel shell can be damaged while the starch on the cold side has yet to gelatinize leading to less explosive popping, which in turn reduces popped volume and leads to chewier popcorn. A corresponding concern is that once the kernel is popped, the "foam" produced from the gelatinizing and re-hardening starch is easily burned giving the popcorn an undesirable taste and texture. A variety of methods are commonly employed to quickly heat popcorn kernels to the appropriate temperature while minimizing burning include: applying microwave energy to the kernels, cooking the kernels in hot oil or fat, baking the kernels with heat conducted through a heating surface, or blowing hot air across the kernels. The different methods can be incorporated into single use packaging for producing a single batch of popcorn, wherein the packaging is discarded after the popcorn is popped, or popcorn makers that can produce repeated batches of popcorn.

The most common popcorn makers cook the kernels in hot oil, fat or a combination thereof heated on a heating surface or pan supplying the necessary heat to pop the kernels. The cooking method efficiently heats the kernels to the appropriate temperature by conducting heat through the oil or fat directly to the kernels. The oil or fat can provide an additional benefit by imparting a desirable buttery taste or other flavor to the popped popcorn. A common alternative to the oil or fat cooking method for popping popcorn is baking the kernels with heat conducted through a heating surface without an oil or fat solution. However, a drawback of both the cooking and baking method is that the methods often waste substantial amounts of heat that is dissipated into the atmosphere. In both methods, the kernels are also typically placed on a heating surface disposed above a heat source. The heat source dissipates a large quantity of heat, some of which is transferred to the heating surface. The heating surface then conducts the heat to the kernels either through direct contact under the baking method or via an oil or fat solution under the cooking method. However, as a substantial amount of the heat output from the heat source is dissipated to the environment, popcorn poppers using either the cooking or baking method may function acceptably even though the heat source design is highly inefficient. Similarly, because the heat source simply radiates heat outwardly, different thermal zones may be formed on the heating surface each having different temperature responses depending on the distance and angle of incidence of the zone from the heat source. The uneven heating may cause some kernels to be under heated, locally over heated, or heat too slowly leading to substandard popping. Depending on the popper design, a fat or oil cooking solution may help evenly distribute the heat and/or control rate of heating resulting in improved popping; however, if a thick coating of oil or fat is required to yield improved popping performance, the monetary and health benefits of such a product may be compromised.

As the baked method of heating kernels does not cook the kernels in oil or fat, a topping is often applied during popping or after the popcorn is popped to impart a buttery taste or any other desirable flavor to the popcorn. Typically, a cover having an integrated topping reservoir is placed over the heating surface containing the kernels or popped popcorn. The topping reservoir can be arranged at the top of the cover and typically comprises vents in the cover such that the topping can be slowly drained through the vents in the cover onto the popcorn as the kernels are popped or after the popcorn is popped. Certain toppings, such as butter, are slowly melted by the steam released from the popped kernels such that the melting topping is slowly applied to the popcorn. Covers also commonly comprise air vents for venting the steam in close proximity to the reservoir or use the same vents for applying the topping to the popcorn to vent the steam. However, the air vents or shared vents often become fouled by the topping as the topping is drained into the cover causing a buildup in steam within the cover. Since the moisture cannot escape, the popcorn does not dry out enough and ends up tasting soggy or chewy.

The different methods of heating often include a mechanical stirrer or agitator to constantly mix the kernels during cooking insuring that the un-popped kernels are evenly heated and the popped kernels are not burnt. However, mechanical stirrers often cause the kernels to bunch or pile up rather than evenly distributing the kernels across the heating surface. The kernels within the bunches or piles are often either unheated or heated at different rates than evenly distributed kernels. Different heating rates can cause some kernels heated at faster rates to pop earlier than kernels heated at slower rates, which may result in the faster popping kernels being burned while the slower popping kernels remain un-popped. The bunches or piles of kernels often form in "blind spots" in the rotational path of the stirrer where the arm of the stirrer cannot reach the kernels or the kernels fall beneath the stirrer arm. A corresponding concern is that stirrers without blind spots may cause the kernels to bunch up against the stirrer arm and be pushed around the heating surface in a bunch rather than being evenly distributed over the heating surface. Even distribution of the kernels over the heating surface allows the kernels to absorb the heat more efficiently, which reduces popping time and reduces heat lost to the environment during the cooking period.

SUMMARY OF THE DISCLOSURE

A representative embodiment of a popcorn maker according to the present disclosure comprises a heat source transferring heat to a heating surface directly via natural convection and radiation and indirectly via radiation from a reflective surface that focuses stray radiant energy back towards the heating surface. Alternatively, the popcorn popper can further comprise a mechanical stirrer on the heating surface for stirring the kernels during heating and evenly distributing the kernels across the heating surface. The popcorn popper can further comprise a cover for the heating surface having an integrated reservoir for holding toppings for the popcorn, wherein the reservoir drains the topping through the cover without fouling the cover air vents providing for even distribution of the topping onto the kernels.

In one aspect, a representative popcorn popper comprises a base unit having an integrated heating element and a reflective surface disposed within the base. The top face of the base unit can further comprise a heating surface adapted to hold kernels and having a generally flat or pan shape, wherein the heating element is disposed immediately below the heating surface and radiates heat to the heating surface. The reflective surface can be arranged beneath the heating element to reflect stray radiant heat back towards the heating surface. The reflective surface can comprise a tear shape so as to direct the reflected heat to desired portions of the heating surface such that the heating surface has a more uniform temperature. In addition, the bottom side of the heating surface can include a surface treatment such as, for example, a high absorptivity coating to improve the transfer of radiant energy to the desired areas.

In another aspect, an embodiment of a popcorn popper of the present disclosure can comprise a base unit having a footing on the bottom of the base unit adapted to insulate any surface upon which the popcorn popper is placed from heat dissipated from the heating element. Alternatively, the base unit can further comprise vents in an exterior of the base unit to ensure internal components remain at suitable temperatures. Similarly, the base unit can also comprise handles disposed on the exterior of the base unit and adapted to allow users to handle the base unit without contacting the heated exterior of the base unit and risking injury.

In yet another aspect, an embodiment of popcorn popper of the present disclosure can comprise a base unit having a mechanical stirrer adapted to rotate on an axis at the center of the heating surface. The base unit can further comprise a stirrer motor disposed below the center of the heating surface and having a drive rod extending through a port in the heating surface to couple the stirrer to the stirrer motor, such that the stirrer motor can rotate the stirrer about its rotational axis. The stirrer can further comprise at least two arms extending outwardly from the rotational axis and adapted to sweep along the heating surface to mix the kernels during heating. The arms can further comprise arched portions adapted to mix the kernels and break up any rows or bunches of kernels that form on the heating surface. The arched portions can be staggered at different radial locations of each arm to facilitate the disruption of rows or bunches to allow for full coverage of the heating surface with kernels.

In yet another aspect, an embodiment of a popcorn popper of the present disclosure can comprise a cover adapted to interface with the base unit to form an enclosed space over the heating surface. The cover can comprise a plurality of air vents disposed at the top of the cover to allow steam released during popping to escape the cover. Alternatively, the cover can comprise handles adapted to interface with the handles of the base unit such that a user can position the base unit and the cover together. The interfacing handles allow a user to flip the popcorn popper over and transfer the popped popcorn from the heating surface into the cover such that the cover can serve as a serving bowl. In another embodiment, the cover can comprise a reservoir disposed at the top of the cover adapted to contain a topping for the popcorn on the heating surface. The reservoir can comprise a receiving portion into which the topping is placed and drains for distributing the topping onto the popcorn. The drains can be arranged between the receiving portion and the air vents and adapted to prevent the topping from clogging the air vents when the topping is added to the reservoir. Alternatively, the cover can further comprise a cap for covering the air vents and the reservoir.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE FIGURES

The invention can be completely understood in consideration of the following detailed description of various embodiments of the invention in connection with the accompanying drawings, in which:

FIG. 12 is a top view of a reservoir according to an embodiment of the present disclosure.

FIG. 12b is a cross-sectional view of the reservoir of FIG. 12.

Figure 1:
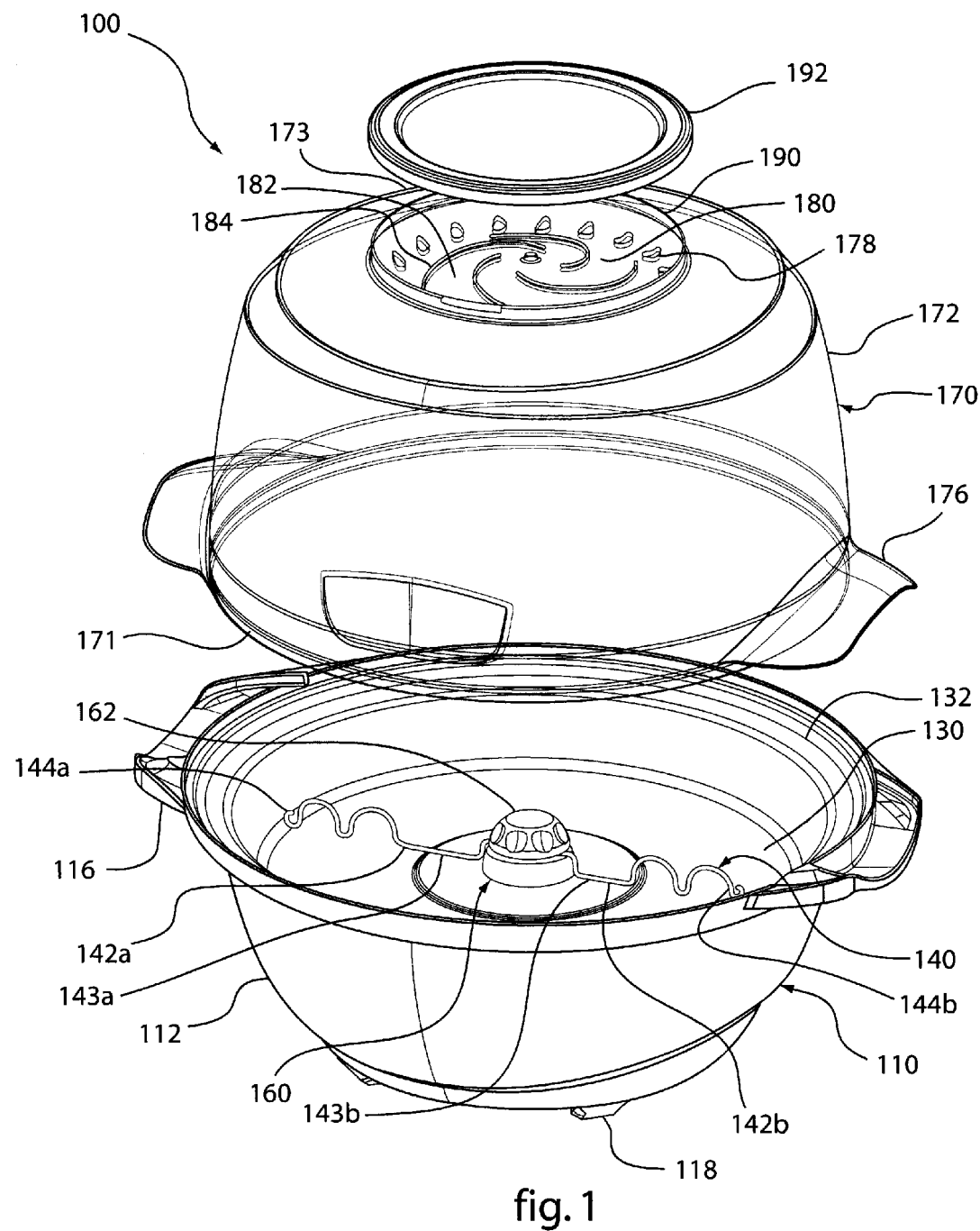
FIG. 1 is an exploded, perspective view of a representative embodiment of a popcorn maker according to the present disclosure.
Figure 2:
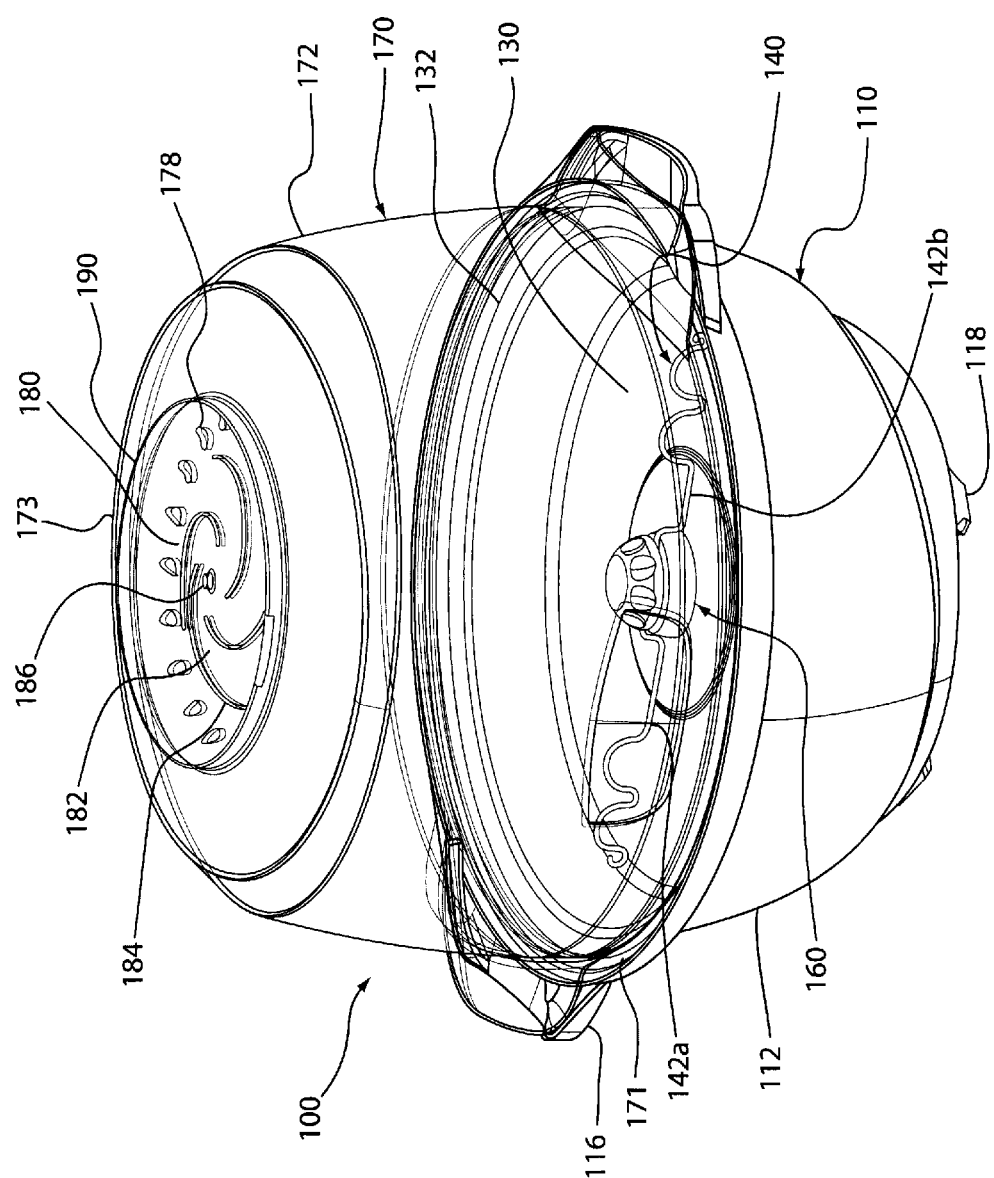
FIG. 2 is a perspective view of the popcorn maker of FIG. 1.
Figure 3:
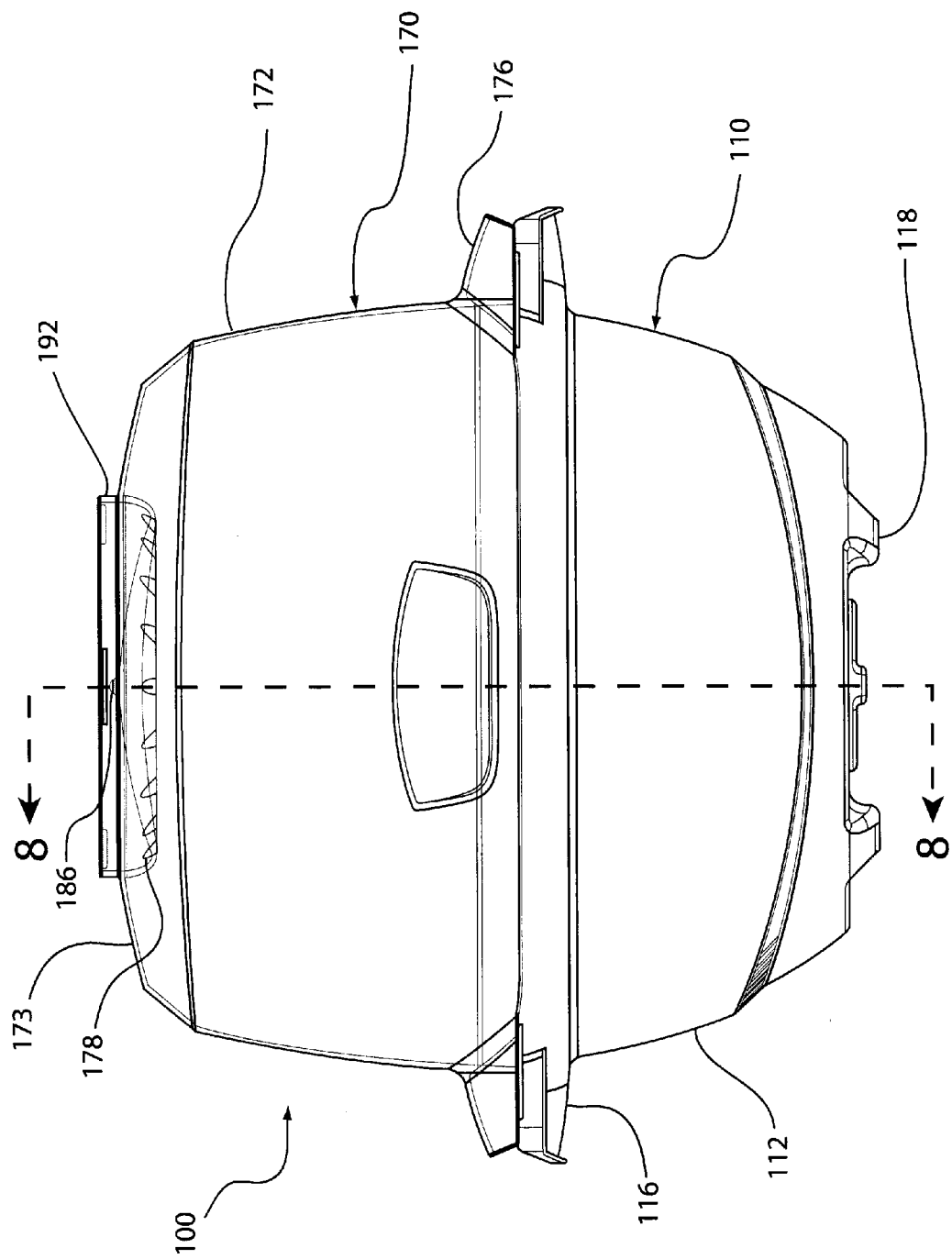
FIG. 3 is a front view of the popcorn maker of FIG. 1.
Figure 4:
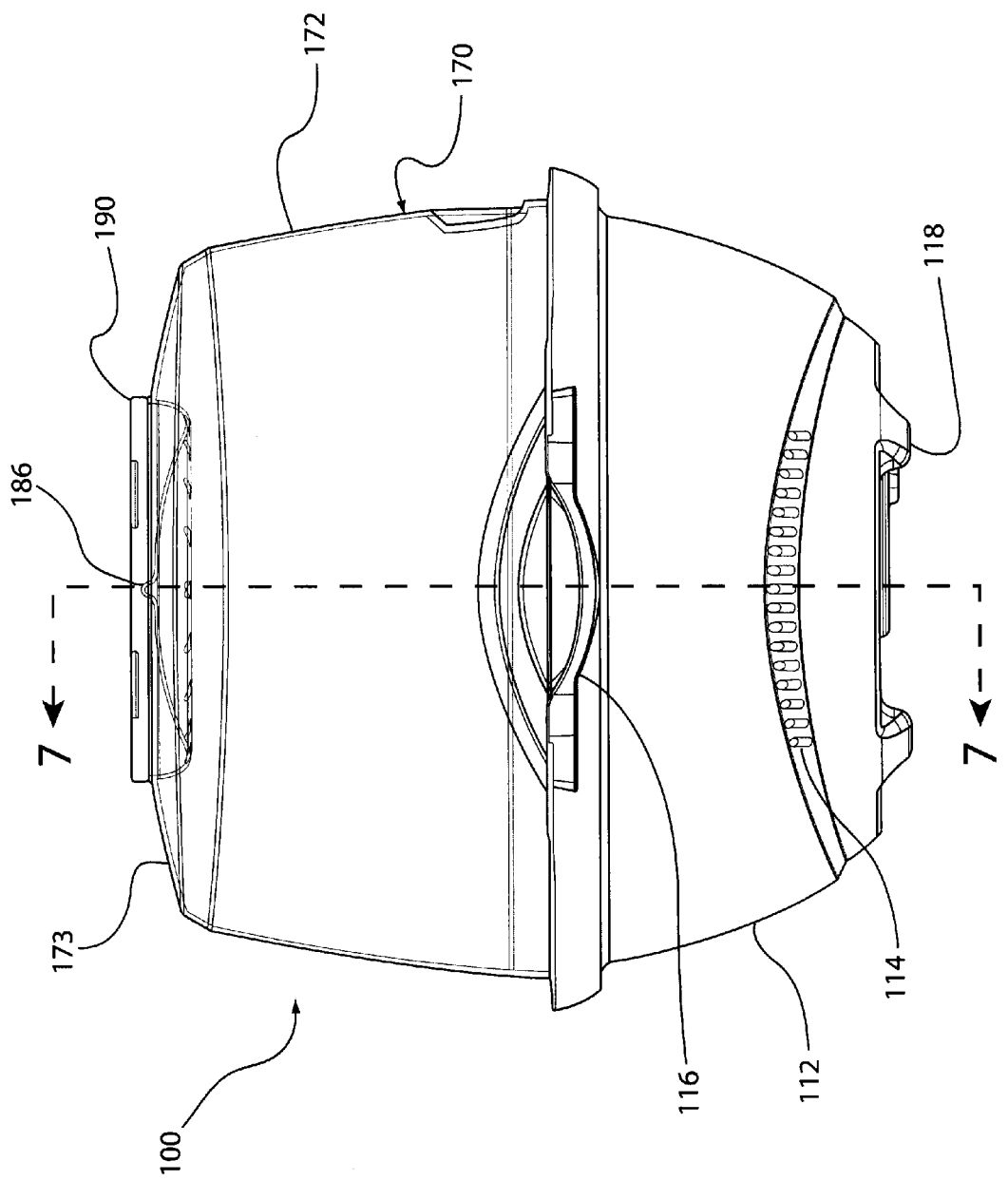
FIG. 4 is a side view of the popcorn maker of FIG. 1.
Figure 5:
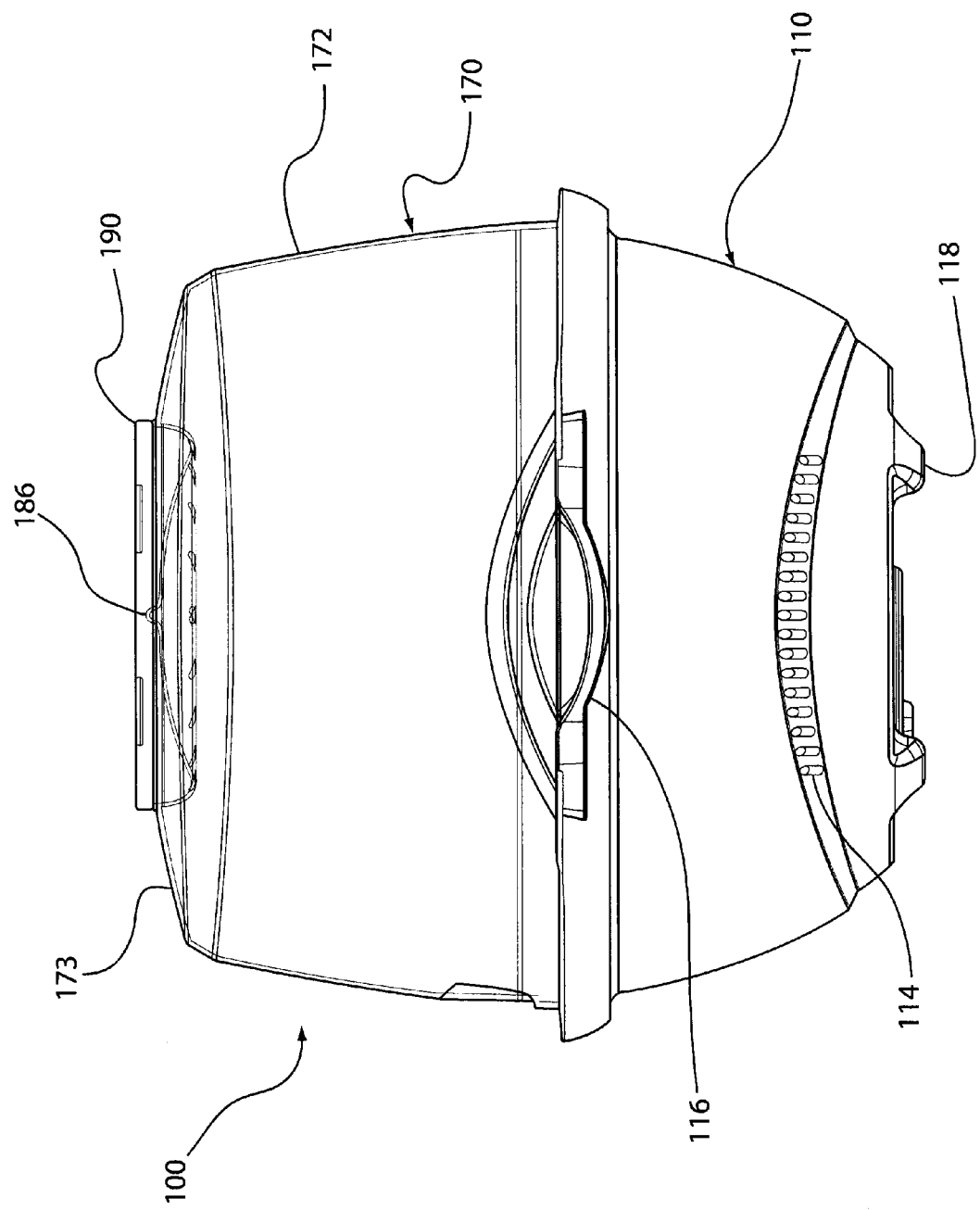
FIG. 5 is a side view of the popcorn maker of FIG. 1.
Figure 6:
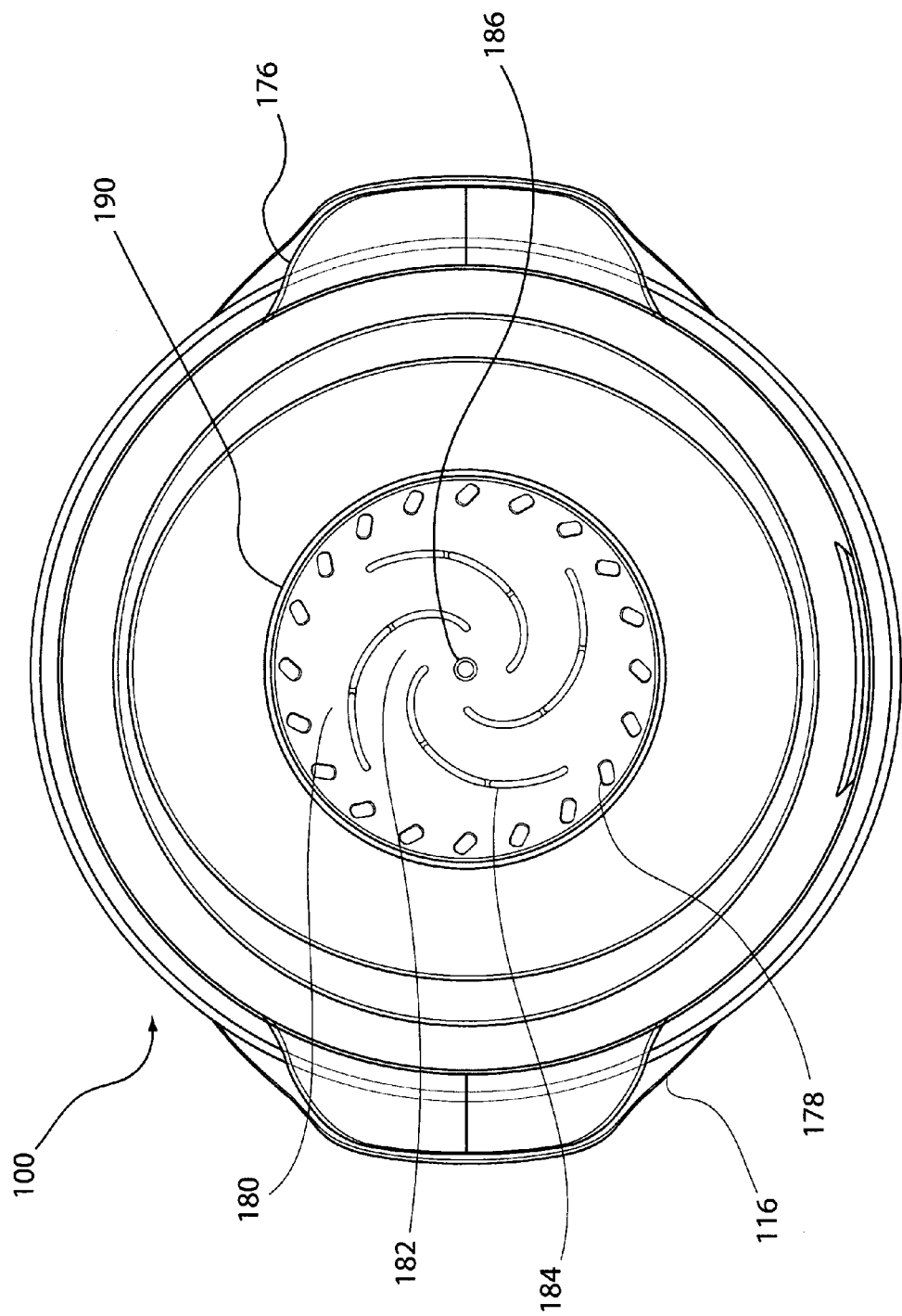
FIG. 6 is a top view of the popcorn maker of FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE FIGURES

As illustrated in FIGS. 1-8, a representative embodiment of a popcorn maker 100 of the present disclosure generally comprises a base unit 110 having a heating element 120, a reflective surface 122 and a heating surface 130. Heating surface 130 defines the top face of base unit 110 and is adapted to receive and heat popcorn kernels. Heating element 120 is disposed within base unit 110 below heating surface 130 and is adapted to supply heat to at least a portion of heating surface 130. Reflective surface 122 is disposed beneath heating element 120 to reflect any heat not radiated directly to heating surface 130 upwards toward heating surface 130.

Heating surface 130 comprises a generally flat surface minimizing the formation of bunches or rows of kernels when the kernels are placed on heating surface 130. Heating surface 130 can further comprise a wall 132 encircling the flat portion of heating surface 130 such that heating surface 130 defines a pan with a flat bottom adapted to receive a quantity of fat or oil for cooking popcorn kernels. Heating surface 130 generally comprises a heat conductive material such as, for example, aluminum capable of absorbing heat from the heating element 120 and conducting the heat to the kernels or cooking solution.

Heating element 120 further comprises an electric heating element 120, such as a resistive coil, in operational contact with or in near proximity to the underside of heating surface 130 such that a substantial portion of the heat generated by heating element 120 is transferred directly into heating surface 130. Heating element 120 can comprise a ring shape to maximize the area of heating surface 130 receiving heat directly from heating element 120.

Figure 9:
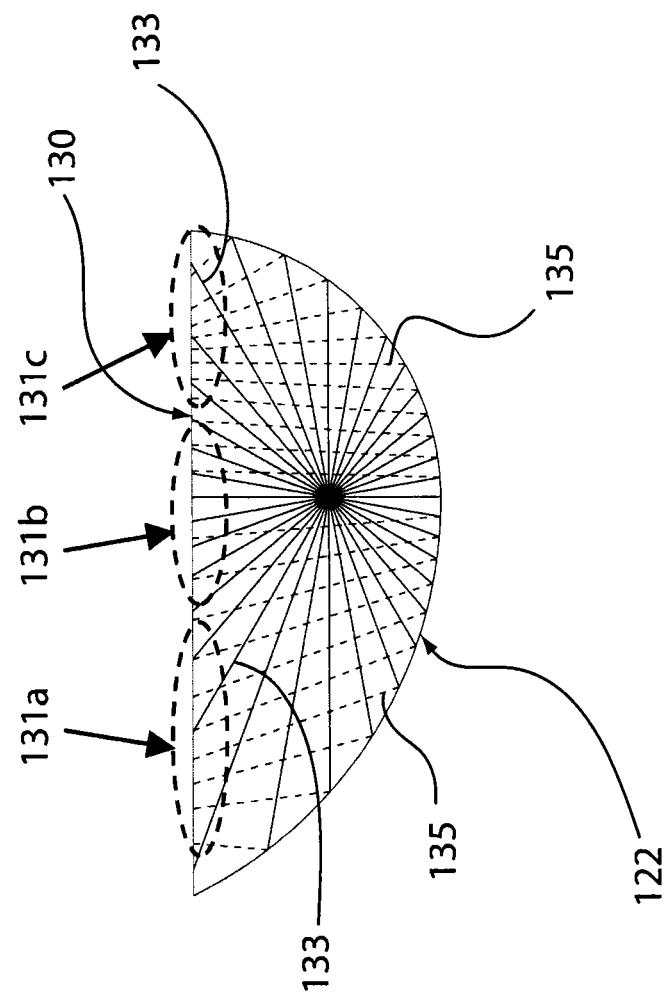
FIG. 9 is an illustration of heating distribution of heat radiated from a heating element and reflected by a reflective surface according to an embodiment of the present disclosure.
Figure 10:
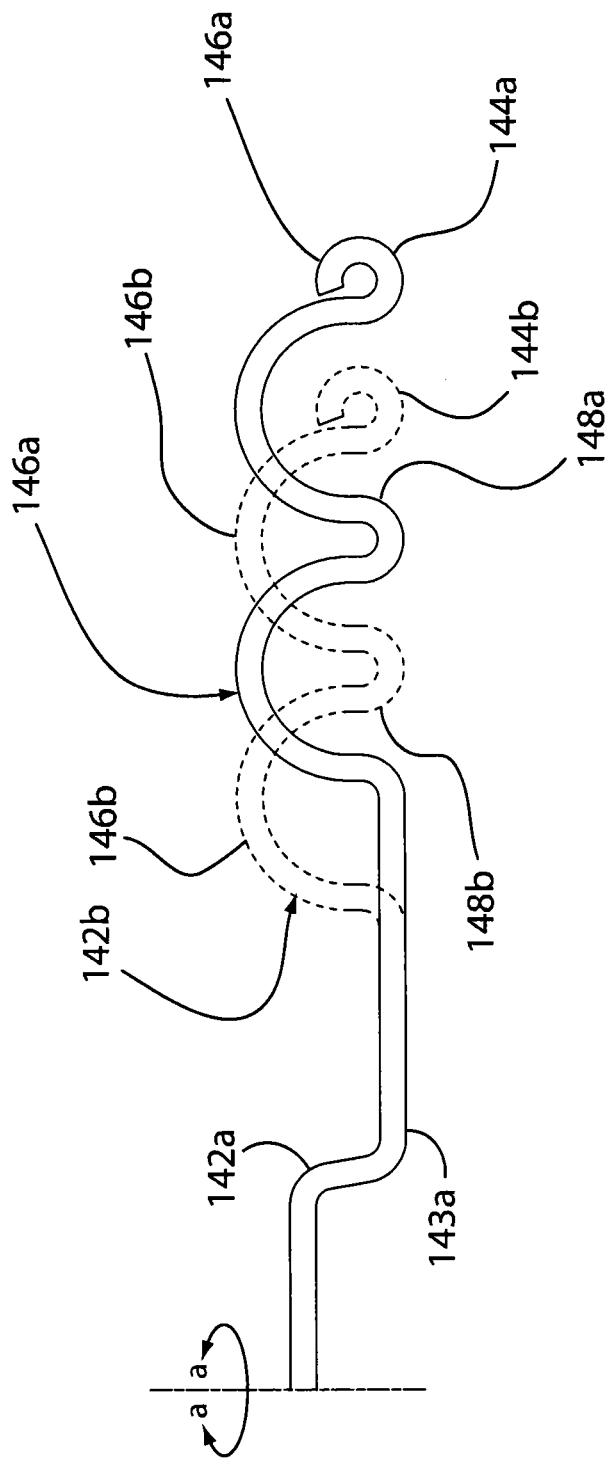
FIG. 10 is a side view of a pair of stirrer arms illustrating overlapped arched portion according to an embodiment of the present disclosure.

Reflective surface 122 generally comprises reflective material such as, for example, aluminum or any other material capable of reflecting heat radiated by heating element 120 away from heating surface 130 toward heating surface 130. As depicted in FIG. 9, reflective surface 122 further comprises a tear shape and is curved around heating element 120 such that heat reflected upwards toward the heating surface 130 is targeted to portions or zones of the heating surface 130 identified as Zone One 131a, Zone Two 131b and Zone Three 131c that are heated by both direct radiation 133, reflected radiation 135 and natural convection from the heating element 120. Reflective surface 122 improves the efficiency of heating element 120 by reducing the amount of heat lost to the environment and balances the heat distribution to the heating surface 130 such that all portions of heating surface 130 are evenly heated by either direct radiation 133 from heating element 120 or reflected radiation 135 from reflective surface 122.

As depicted in FIGS. 1-6, base unit 110 can further comprise an exterior 112. Exterior 112 can further comprise air vents 114 providing ventilation for internal components. The base unit 110 can also further comprise handles 116 extending outwardly from exterior 112 of base unit 110 such that users can orient or move the popcorn maker 100 without touching heating surface 130 or exterior 112 of base unit 110, which can become hot from the heating element 120. Also, base unit 110 can further comprise a footing 118 defining the bottom projections of base unit 110. Footing 118 is adapted to prevent popcorn maker 100 from damaging surfaces upon which it is placed with heat generated by heating element 120. In addition, footing 118 allows air to flow into vents on the bottom of the base unit 110 in order to maintain internal components at acceptable temperatures.

As depicted in FIGS. 1-2, 7 and 10, base unit 110 can further comprise a mechanical stirrer 140 disposed on heating surface 130 and adapted to mix the kernels to evenly distribute the kernels across heating surface 130. Mechanical stirrer 140 can further comprise at least two arms 142a, 142b rotating about a rotational axis a-a disposed at the center of the heating surface 130. The arms 142a, 142b each further comprising arm portions 143a, 143b and stirring portions 144a, 144b. Stirring portions 144a, 144b comprise a plurality of arches 146a, 146b creating "blind spots" that form rows of kernels and also having valleys 148a, 148b for breaking up rows of kernels. As specifically illustrated in FIG. 10, the stirring portions 144a, 144b of the at least two arms 142a and 142b are offset such that the arches 146a on first arm 142a form a plurality of rows that are subsequently broken up by valleys 148b on second arm 142b. The offsetting stirring portions 144a, 144b allow mechanical stirrer 140 to effectively mix the kernels without causing the kernels to bunch up against arms 142a, 142b of the mechanical stirrer 140 or form unbroken bunches or rows of kernels on heating surface 130. In an alternative embodiment, base unit 110 can comprise a plurality of mechanical stirrers 140 each having at least one arm 142a or 142b further comprising a stirring portion 144a or 144b. The plurality of mechanical stirrers 140 extend outward from rotational axis a-a disposed at the center of the heating surface 130 such that the plurality of arms 142a and 142b rotate around rotational axis a-a. With arms 142a, 142b rotating about axis a-a, arches 146a and valley 148a sweep across heating surface 130 at a unique distance from axis a-a when compared to arches 146b and valley 148b.

Figure 7:
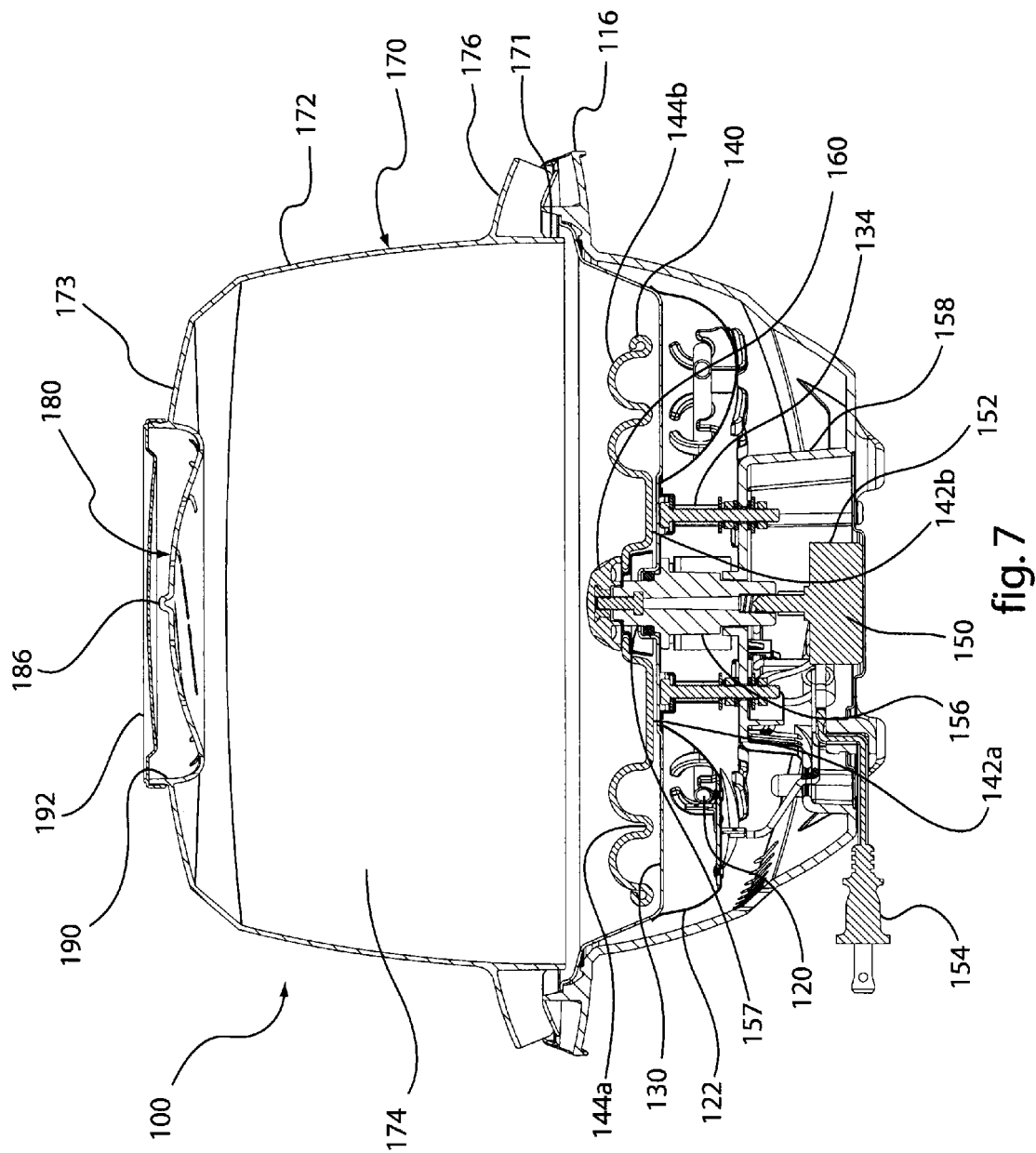
FIG. 7 is a cross-sectional side view of the popcorn maker of FIG. 1 taken at line 7-7 of FIG. 4.
Figure 8:
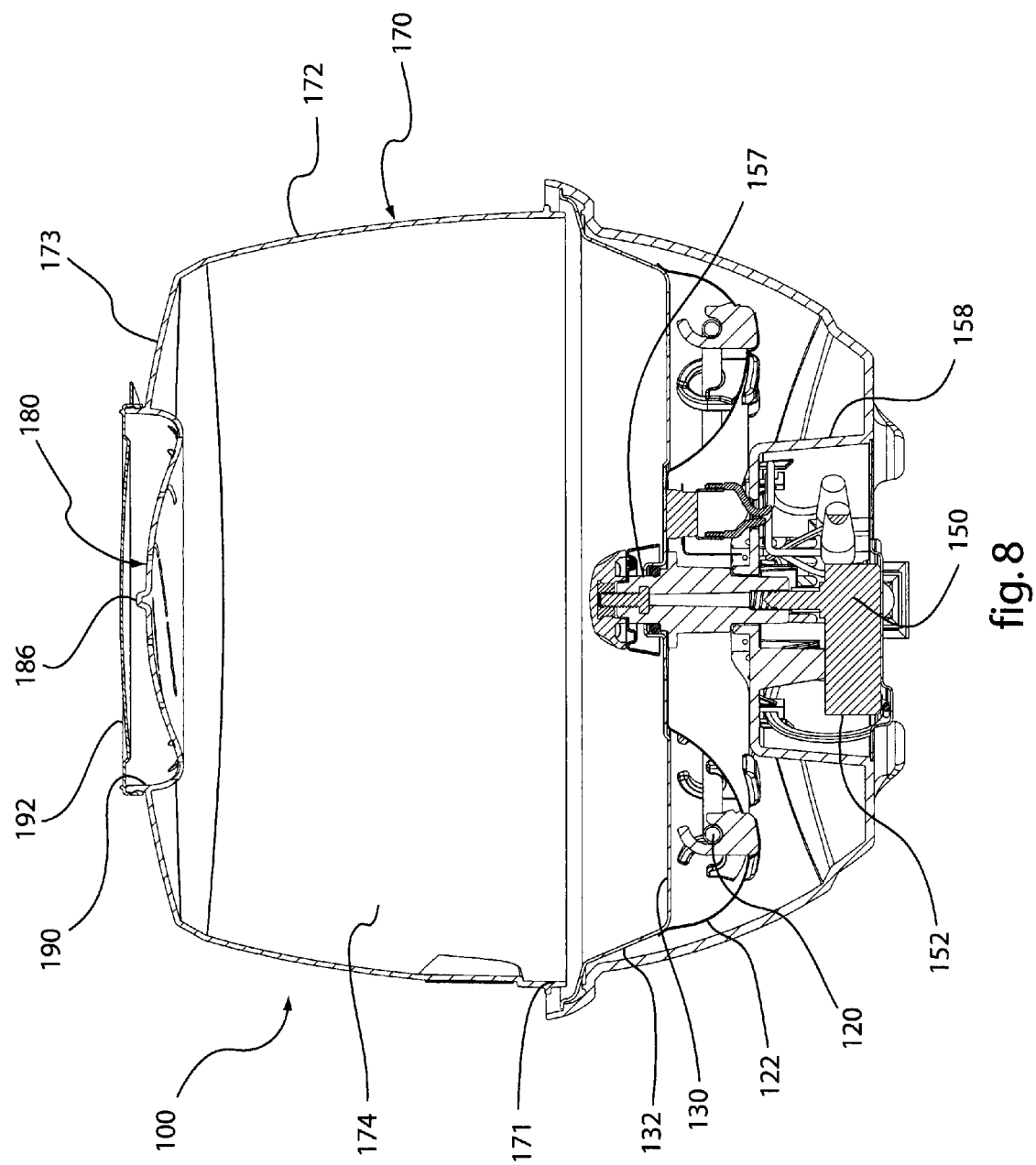
FIG. 8 is a cross-sectional side view of the popcorn maker of FIG. 1 taken at line 8-8 of FIG. 3.
Figure 11:
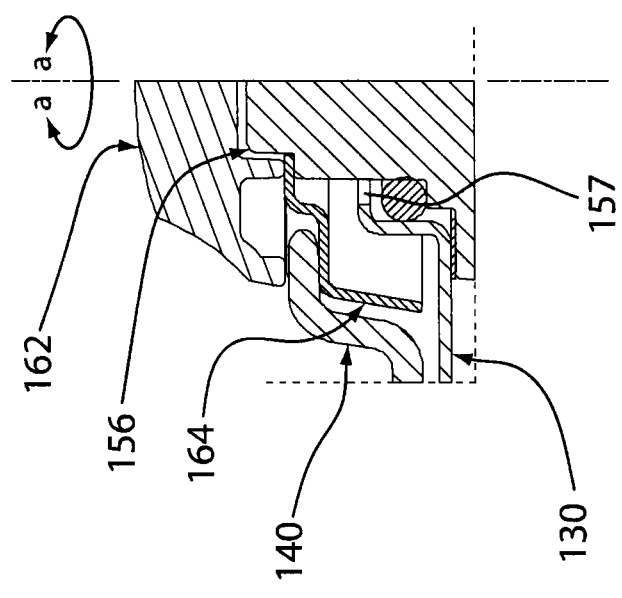
FIG. 11 is a partial cross-sectional side view of a stirrer interface according to an embodiment of the present disclosure.

Referring to FIGS. 7, 8 and 11, base unit 110 can further comprise a motor assembly 150 for rotating mechanical stirrer 140. Motor assembly 150 can further comprise an electric motor 152, an electric power source 154 powering both electric motor 152 and heating element 120, a motor coupling 156 and a stirrer interface 160 adapted to operably couple the mechanical stirrer 140 to motor 152. Motor coupling 156 extends from within base unit 110 through a motor port 157 in the heating surface 130 to link electric motor 152 to stirrer interface 160. Stirrer interface 160 can further comprise a cap 162 adapted to grip mechanical stirrer 140 and a drive guard 164 adapted to prevent kernels or fragments of popped popcorn from entering motor port 157 and fouling motor 152 or preventing the rotation of mechanical stirrer 140 about axis a-a.

Referring to FIGS. 7 and 8, base unit 110 can further comprise a motor housing 158 separating electric motor 152 from the other components contained within base unit 110. Specifically, motor housing 158 separates and insulates electric motor 152 from heating element 120. Heating surface 130 can further comprise supports 134 disposed below heating surface 130 and resting on motor housing 158. Supports 134 are operationally linked to heating surface 130 and are adapted to limit the heat flow from the heating surface 130 to the motor housing 158 and to sufficiently secure the heating surface 130 and reflective surface 122 to exterior 112.

As depicted in FIGS. 1-8, popcorn maker 100 can further comprise a cover 170 having a dome 172. Dome 172 generally includes a top face 173 and a lower perimeter wall 171 that is adapted to interface with the edge of heating surface 130 such that a contained interior space 174 is defined above heating surface 130. Popcorn kernels are often moved by the force of the bursting kernel. Interior space 174 is adapted to contain the kernels when launched into the air during popping and also receive and hold at least a portion of the popped kernels if cover 170 is inverted. Alternatively, cover 170 can further comprise cover handles 176 adapted to interface with handles 116 of base unit 110. Interfacing cover handles 176 and handles 116 of base unit 110 permits the user to invert popcorn maker 100 without separating cover 170 from the base unit 110. Cover 170 is adapted to receive popped kernels from base unit 110 by simply inverting popcorn maker 100 and removing the base unit 110 such that cover 170 can be used as a bowl.

Referring to FIGS. 1-8, 12 and 12b, dome 172 can further comprise a plurality of air vents 178 disposed at the top face 173 of dome 172 and adapted to vent the steam generated by the popping process from interior space 174. Dome 172 can further define a topping reservoir 180 disposed at the top of dome 172. Topping reservoir 180 can further comprise a receiving surface 182 adapted to receive toppings added to the reservoir 180 and a plurality of drains 184 adapted to evenly distribute the topping over a portion of the popcorn. Drains 184 are arranged between receiving surface 172 and air vents 178 to prevent the topping added to receiving surface 182 from fouling the air vents 178. Drains 184 can also be shaped to prevent fouling of air vents 178 while maximizing the distribution of the topping over the popcorn on heating surface 130. Drains 184 can comprise overlapping linear or s-curved drains such that topping added to the topping reservoir 180 intersects at least one of plurality of drains 184 when the topping is added to receiving surface 182. Topping reservoir 180 can alternatively further comprise a butter post 186 adapted to receive solid butter or other solid toppings and hold the solid topping at the center of the topping reservoir 180 as the topping is melted by the steam from the popped kernels. Dome 172 can further comprise a wall 190 encircling the air vents 178 and drains 184 preventing spillage or overflow of topping added to topping reservoir 180. The position, size, and shape of the drains 184, vents 178, and wall 190 minimize splatter of oil towards the user during popping. As depicted in FIG. 1, cover 170 can further comprise a lid 192 adapted to interface with wall 190 to cover the air vents 178 and drains 184 when the popcorn maker 100 is not in use or if cover 170 is inverted for use as a serving bowl.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative embodiments.

What is claimed is:

1. A popcorn maker comprising:
   a heating surface capable of receiving a quantity of popcorn kernels;
   a heating element disposed below the heating surface and adapted to direct heat to the heating surface; and
   a mechanical stirrer disposed on the heating surface, the mechanical stirrer including at least a pair of arms, each arm including at least one upwardly arched portion defining a blind spot below the at least one upwardly arched portion adapted to form and break up rows of kernels, wherein the mechanical stirrer rotates on top of the heating surface to distribute the popcorn kernels about the heating surface and wherein the at least one upwardly arched portion of each arm is offset from the remaining arms such that the at least one upwardly arched portion of each arm sweeps across the heating surface at a unique distance as measured form a common rotational axis.

2. The popcorn maker of claim 1, further comprising:
   a cover having a top face and a bottom edge adapted to interface with the heating surface and further comprising:
   a plurality of air vents disposed on the top face of the cover.

3. The popcorn maker of claim 2, further comprising:
   a reservoir disposed on the top face of the cover having a receiving surface adapted to receive a quantity of popcorn topping and a plurality of drains;
   wherein the plurality of drains is adapted to distribute the quantity of popcorn topping fed onto the receiving surface onto the quantity of popcorn kernels on the heating surface.

4. The popcorn maker of claim 3, wherein the plurality of drains is disposed between the receiving surface and the plurality of air vents, wherein the plurality of drains prevents the quantity of popcorn topping from fouling the plurality of air vents.

5. The popcorn maker of claim 3, wherein the plurality of drains comprises a series of overlapping drains that deliver popcorn topping to the popcorn at continuously varying radial locations.

6. The popcorn maker of claim 1, further comprising:
   a guard preventing kernels from fouling the mechanical stirrer and preventing the rotation of the mechanical stirrer.

7. The popcorn maker of claim 1, further comprising a reflective surface adapted to redirect heat originally radiated away from the heating surface toward the heating surface.

8. The popcorn maker of claim 7, wherein the reflective surface has a tear shape adapted to direct and allocate the stray radiant heat to the desired zones of the heating surface.

9. The popcorn maker of claim 7, wherein the reflective surface comprises a commercial aluminum material, reflecting radiant heat very well at an economically viable material cost for the end product.

10. The popcorn maker of claim 1, wherein the heating surface comprises a pan shape having a flat portion and a wall.

11. The popcorn maker of claim 1, wherein the heating surface comprises a heat conductive material adapted to transfer heat received by the heating surface to the quantity of popcorn kernels.

12. The popcorn maker of claim 1, wherein the heating element comprises an electric resistive coil.

13. The popcorn maker of claim 1, further comprising at least two base unit handles for orientating popcorn maker without contacting the heating surface.

14. The popcorn maker of claim 13, further comprising:
   a cover having a bottom edge adapted to interface with the heating surface and at least two cover handles adapted to interface with the base unit handles, wherein the heating surface and the cover are adapted to be inverted without separating the cover from heating surface to transfer the popcorn kernels from the heating surface to the cover.

15. The popcorn maker of claim 1, wherein each arm includes a plurality of upwardly arched portions.

* * * * *